(12) United States Patent
Miyachi et al.

(10) Patent No.: US 7,857,035 B2
(45) Date of Patent: Dec. 28, 2010

(54) SUN SHADE APPARATUS

(75) Inventors: Yutaka Miyachi, Kariya (JP); Shinji Tominaga, Kariya (JP); Yoshitaka Jokaku, Kariya (JP); Koichi Takeuchi, Kariya (JP); Atsushi Sato, Kariya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 472 days.

(21) Appl. No.: 11/882,936

(22) Filed: Aug. 7, 2007

(65) Prior Publication Data

US 2008/0035284 A1 Feb. 14, 2008

(30) Foreign Application Priority Data

Aug. 10, 2006 (JP) .............................. 2006-218098

(51) Int. Cl.
*B60J 3/00* (2006.01)
(52) U.S. Cl. .............................. 160/370.22; 160/290.1; 160/265
(58) Field of Classification Search ............ 160/370.22, 160/265, 274, 290.1, 331; 296/97.8, 97.4, 296/152
See application file for complete search history.

(56) References Cited

U.S. PATENT DOCUMENTS

| | | | | | |
|---|---|---|---|---|---|
| 5,025,847 | A | * | 6/1991 | Mueller | 160/270 |
| 5,139,074 | A | * | 8/1992 | Warner | 160/271 |
| 5,139,075 | A | * | 8/1992 | Desrochers | 160/310 |
| 5,560,668 | A | * | 10/1996 | Li | 296/97.8 |
| 5,601,133 | A | * | 2/1997 | Krupke et al. | 160/265 |
| 5,620,039 | A | * | 4/1997 | Delgado et al. | 160/265 |
| 6,347,825 | B2 | | 2/2002 | Seel et al. | |
| 6,416,103 | B1 | | 7/2002 | Laudenbach et al. | |
| 6,848,493 | B1 | | 2/2005 | Hansen et al. | |
| 6,910,518 | B2 | * | 6/2005 | Zimmermann et al. | 160/370.22 |
| 7,302,988 | B2 | * | 12/2007 | Heitel | 160/274 |
| 7,314,079 | B2 | * | 1/2008 | Yano et al. | 160/370.22 |
| 7,396,067 | B2 | * | 7/2008 | Thumm et al. | 296/143 |

FOREIGN PATENT DOCUMENTS

| | | |
|---|---|---|
| DE | 299 21 859 | 8/2000 |
| EP | 1 084 907 | 8/2000 |

(Continued)

OTHER PUBLICATIONS

European Search Report mailed Nov. 15, 2007 for European Application No. 07114011.5-1268.

*Primary Examiner*—David Purol
(74) *Attorney, Agent, or Firm*—Wenderoth, Lind & Ponack, L.L.P.

(57) ABSTRACT

A sun shade apparatus of the present invention has a curtain capable of shielding a window portion of a door. The curtain can be stretched between a shielding state and an open state on the window portion. The apparatus has a motor, a cable provided so as to be capable of being forced out or drawn in by the operation of the motor, and a connector connecting the cable and the curtain to each other. The curtain is stretched with the operation for forcing out or drawing in the cable. The connector has a connection release mechanism that releases the cable and the curtain from the state of being connected when a load equal to or higher than a predetermined value is applied against the operation for forcing out or drawing in the cable.

2 Claims, 6 Drawing Sheets

FOREIGN PATENT DOCUMENTS

| | | |
|---|---|---|
| EP | 1 389 544 | 2/2004 |
| JP | 6-22034 | 3/1994 |
| JP | 2003-182358 | 7/2003 |
| JP | 2005-096529 | 4/2005 |
| JP | 2005-319958 | 11/2005 |

\* cited by examiner

SUN SHADE APPARATUS

CROSS REFERENCE TO RELATED APPLICATION

This application claims priority from Japanese Patent Application No. 2006-218098 filed Aug. 10 2006. The entire contents of this priority application are incorporated herein by reference.

BACKGROUND OF THE INVENTION

I. Technical Field

The present invention relates to a sun shade apparatus mounted on a vehicle door or the like.

II. Description of Related Art

A motor-driven type of vehicle door sun shade apparatus drives a motor to perform an operation to force out or draw in a cable. With this operation, a curtain connected to the cable is stretched. A window portion of a vehicle door is shielded by stretching the curtain in this way to prevent an increase in temperature in the vehicle compartment and protect [[a]] privacy in the vehicle compartment. See, for example, Japanese Patent Laid-Open Nos. 2003-182358 and 2005-96529.

However, since the curtain stretching operation is performed by driving a motor in such a sun shade apparatus, the cable or the curtain, or a connector for connecting the cable and the curtain or the like may be deformed, for example, when a foreign object is jammed in the curtain stretching direction to impose an excessive load in the direction opposite to the cable forcing-out or drawing-in direction. This may cause a malfunction.

There has been a need to provide a rail for the stretching operation based on use of a cable. If the rail sectional area is increased, for example, as a result of the provision of a safety mechanism (a mechanism for stopping the operation in the event of emergency) or the like for ensuring safety at a position in the course of the cable operation, the area of vision may be so reduced that a safety check may be difficult.

SUMMARY OF THE INVENTION

An object of the present invention is to provide a sun shade apparatus in which a malfunction or the like does not occur even when an excessive load is imposed in the direction opposite to the curtain stretching direction.

A sun shade apparatus of the present invention is characterized by including a motor, a cable provided so as to be capable of being forced out or drawn in by the operation of the motor, a curtain capable of shielding a window portion by being stretched between a shielding state and an open state on the window portion with the operation for forcing out or drawing in the cable, a connector connecting the cable and the curtain to each other, and a connection release mechanism provided in the connector, the connection release mechanism enabling release of the cable and the curtain from a state of being connected by the connector when a load higher than a predetermined value is applied against the operation for forcing out or drawing in the cable.

According to the thus-arranged sun shade apparatus, the connection release mechanism releases the curtain and the cable from the connected state even when a load higher than a predetermined value is applied in the direction opposite to the cable forcing-out or drawing-in direction. In this way, deformation of the cable or the curtain, or the connector is prevented and the sun shade apparatus is enabled to sufficiently perform the functions and to have improved reliability. The load against the cable forcing-out direction or drawing-in operation comprises a load applied to the curtain (e.g., a load applied due to jamming of a foreign object in the direction of movement of the curtain or the like) and a load applied to the connector or the like. In particular, assuming that the connection release mechanism may operate to release the curtain and the cable from the connection when a load is applied to the curtain or the connector, application of the force from the cable to the curtain is thereby stopped to prevent occurrence of a fault such as deformation of the curtain.

In the sun shade apparatus of the present invention, the connector may have a male engaging portion provided on the cable side or on the curtain side and a female engaging portion provided on the curtain side or on the cable side and constituted by an elastic member, and connect the cable and the curtain by engaging the male engaging portion with the female engaging portion. The connection release mechanism may disengage the male engaging portion and the female engaging portion based on elastic deformation of the female engaging portion when the load is applied.

The connection release mechanism based on such engagement between the male engaging portion and female engaging portion is simple in structure and capable of easily releasing the curtain and the cable from the connection or restoring the connection based on elastic deformation of the female engaging portion, and enables the sun shade apparatus to easily repeat performing its function.

The female engaging portion may have a recess formed by a plate spring and the male engaging portion may have a projection. The connection release mechanism may fit the projection and the recess to each other during normal operation and release the projection and the recess from the fitted state by elastic deformation of the recess to disengage the male engaging portion and the female engaging portion in the event of abnormality under application of the load.

The thus-arranged connection release mechanism has the female engaging portion formed so as to have a recess formed by a plate spring and performs release from the connection based on elastic deformation of the recess formed by the plate spring. Therefore, the construction can be simplified and a reduction in size of the female engaging portion and, hence, a reduction in size of the connector can be achieved. Consequently, for example, in a case where a rail or the like for sliding of the connector along the movement of the cable, the width of the rail can be reduced to ensure the maintenance of the field of view and an improvement in the appearance design. Also, the range of use of the connection release mechanism can be increased by suitably selecting the spring constant of the plate spring. For example, if a plate spring having a predetermined spring constant according to the weight of the curtain, the size of the window portion and other factors is selected, the sun shade apparatus can be applied to various uses.

The female engaging portion may have the recess provided between at least two projections formed along the direction of forcing out or drawing in the cable.

According to this arrangement, the projection (on the male engaging portion side) is fitted in the recess positioned between the two projections (on the female engaging portion side). In this case, at the time of cable forcing out operation, the projection on the male engaging portion side comes off from one of the projections on the female engaging portion side. At the time of drawing-in operation, the projection on the male engaging portion side comes off from the other of the projections on the female engaging portion side. Disengagement is effected by this coming-off. Thus, release from the connection can be suitably performed in the event of application of the above-mentioned load regardless of the cable moving direction. Moreover, release from the connection can be achieved by using the simple arrangement which only involves arranging projection formed by the plate spring in the direction of the movement of the cable. Therefore the arrangement contributes to a reduction in size of the apparatus as well as to a reduction in cost.

The above-described projection may have a projecting shape with a slanting surface in the direction of forcing out or drawing in the cable.

If the projection of the male engaging portion is formed of such a projecting shape with a slanting surface, application of a large force between the male engaging portion and the female engaging portion at the time of release from the connection can be avoided to achieve a smooth release operation. That is, the recess and the projection can be released from the fitted state in the direction along the slanting surfaces at the time of release from the connection and, therefore, the release operation can be performed smoothly, for example, in comparison with a case where the recess and the projection are vertically fitted to each other. Also, the magnitude (critical value) of the load at which release from the connection is started can be designed through the slanting angle of the slanting surface. For example, release from the connection is performed at a smaller load if the slanting angle of the slanting surface is reduced, and release from the connection is performed at a higher load if the slanting angle is increased.

BRIEF DESCRIPTION OF THE DRAWINGS

FIG. 3 is a sectional view taken along the line A-A in FIG. 1, showing a cable in a state of being drawn in;

DETAILED DESCRIPTION OF THE INVENTION

A sun shade apparatus of the present invention will be described with respect to an illustrative aspect thereof with reference to the drawings.

Figure 1:
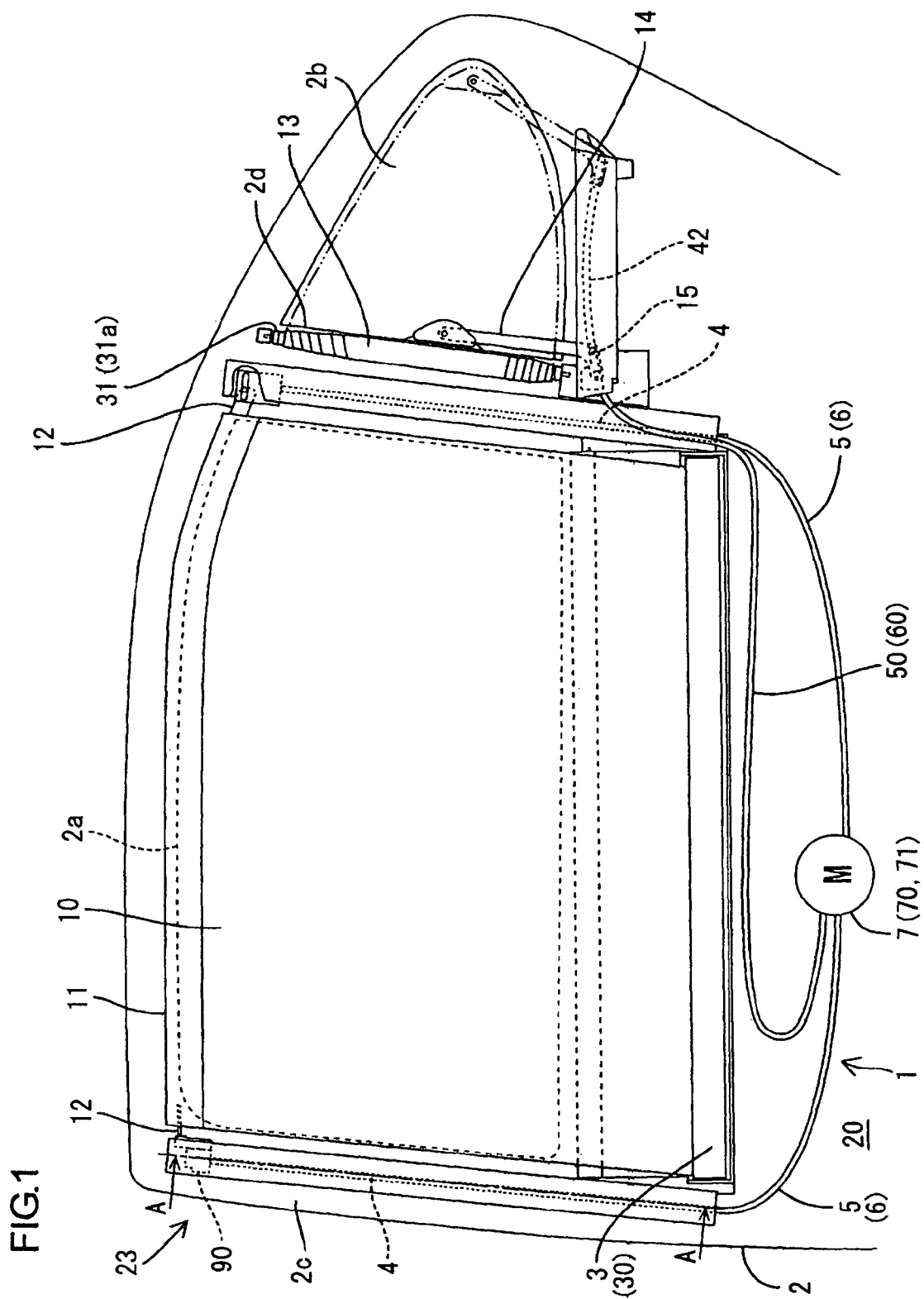
FIG. 1 is a front view of a door of a vehicle from the vehicle interior side.

FIG. 1 is a front view of a vehicle door having a sun shade apparatus in accordance with the present invention seen from the vehicle interior side. As shown in FIG. 1, a vehicle door 23 of the present illustrative aspect has a door panel 2 having side windows 2a and 2b, and a sun shade apparatus (also called a blind apparatus) 1 is provided on the inside of the door panel 2. The door panel 2 has the side windows 2a and 2b in its upper region, the area of which is about half the entire area, and also has a pillar 2c and a pillar (division frame) 2d.

The pillar 2c stands at the vehicle-front-side edge of the door and constitutes a vehicle-front-side window member for the first side window 2a. The pillar 2d stands between the side windows 2a and 2b and partitions these side windows from each other. The pillar 2d constitutes a vehicle-rear-side window member for the first side window 2a and also constitutes a vehicle-front-side window member for the second side window 2b. The pillars 2c and 2d extend substantially parallel to each other to form the first side window 2a on the vehicle front side in substantially rectangular form.

On the other hand, the second side window 2b on the vehicle rear side is formed in substantially triangular form by being partitioned by the pillar 2d. A window glass is mounted in the first side window 2a so as to be upwardly/downwardly movable, while a window glass is immovably mounted in the second side window 2b. A trim 20 is mounted in a lower region of the door panel 2. The trim 20 covers substantially the entire region on the vehicle interior side of the door panel 2 below the side windows 2a and 2b.

The sun shade apparatus 1 has a first blind sheet (curtain) 10 for covering the first side window 2a and a second blind sheet (curtain) 13 for covering the second side window 2b, as shown in FIG. 1. The sun shade apparatus 1 also has a case 3 provided with a roll-up shaft 30 for rolling up the first blind sheet 10, a case 31 having a roll-up shaft 31a for rolling up the second blind sheet 13, and stretching means (6, 7) for stretching the first blind sheet 10 and the second blind sheet 13 between a shielding state and an open state.

The blind sheets 10 and 13 are sheets for shielding light coming into the vehicle compartment (light shielding or attenuating sheets), e.g., mesh sheets or translucent sheets). The blind sheets 10 and 13 are stretched along the vehicle-interior-side surfaces of the window glasses mounted in the side windows 2a and 2b to cover the side windows 2a and 2b.

A frame 11 is attached to an upper end edge of the first blind sheet 10. The frame 11 stretches the upper end edge of the first blind sheet 10 in the vehicle front-rear direction. Sliders 12 extending in the frontward and rearward directions are provided on the front and rear ends of the frame 11.

The sun shade apparatus 1 has a pair of rails 4 for guiding and supporting the sliders 12. Each rail 4 extends along the pillar 2c or the pillar 2d to guide and support the slider 12 in the upward/downward direction. The rails 4 are provided at the same position in the height direction as the first side window 2a.

The stretching means for stretching the first blind sheet 10 is a means for lifting the sliders 12 along the rails 4. The stretching means has two cables 6, two cable guides 5 and one pay-out device 7.

Figure 5:
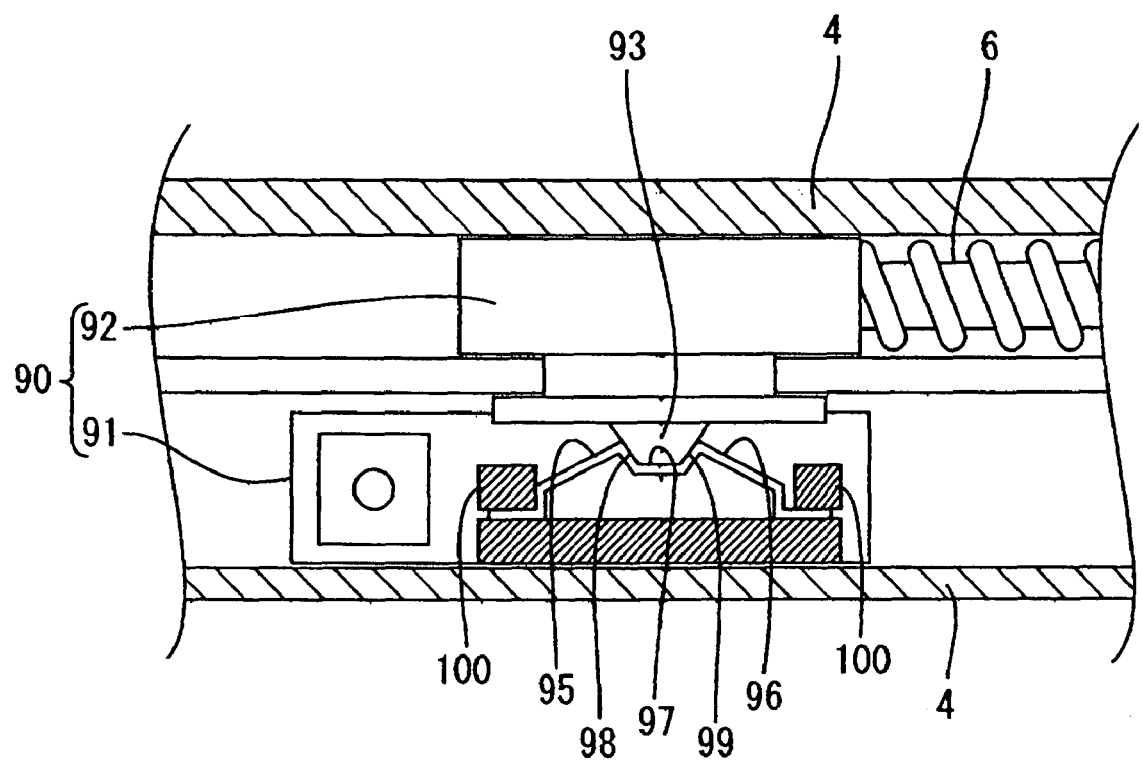
FIG. 5 is a schematic enlarged sectional view of a connector.

Each cable guide 5 is tubular and a cable 6 is inserted through the cable guide 5. The cable 6 is a compression-resistant member having, for example, as shown in FIG. 5, a core wire formed of a flexible metal wire or a plastic wire or the like, and a coil spirally wound around the outer periphery of the core wire with a constant pitch. One end of the cable 6 is attached by means of a connector 90 (see FIG. 2) to the slider 12 provided on the frame 11 for the first blind sheet 10. The cable 6 is inserted through the rail 4 and subsequently through the cable guide 5. Accordingly, the cable 6 is guided and supported by and moved along the rail 4 and the cable guide 5 to move the slider 12 along the rail 4.

The pay-out device 7 is provided on an intermediate portion of the cable guide 5.

The pay-out device 7 has a gear box 70 having a gear, and a motor 71. The gear is of such a construction (not shown) as to mesh with the coil of the cable 6, and is rotated by the drive force of the motor 71. The cable 6 is paid out by the rotation of the gear. The cable 6 is thereby moved to lift the slider 12 while being guided by the cable guide 5 and the rail 4.

The two cable guides 5 are connected to the pay-out device 7. The two cables 6 inserted through the two cable guides 5 respectively are simultaneously paid out by the one pay-out device 7. Consequently, the two cables 6 lift a pair of sliders 12 in synchronization with each other.

A frame 14 is attached to a stretching end edge of the second blind sheet 13. A slider 15 which projects downward is attached to a lower end of the frame 14.

The sun shade apparatus 1 also has a rail 42 for guiding and supporting the slider 15. The rail 42 is provided below the second side window 2b and extends in the vehicle front-rear direction along the lower end of the second side window 2b. The rail 42 is disposed between the door panel 2 and the trim 20.

The stretching means for stretching the blind sheet 13 is a means for pushing the slider 15 toward the rear of the vehicle along the rail 42. The stretching means for stretching the blind sheet 13 includes a cable 60, a cable guide 50 and the pay-out device 7 for paying out the cable 60. The pay-out device 7 has a gear box 70 and a motor 71. The cable 60 is connected to the slider 15 and is inserted through the rail 42 and the cable guide 50.

On the other hand, the roll-up shaft 30 is provided in the case 3 and is axially supported by the case 3. A lower end edge of the first blind sheet 10 is attached to the roll-up shaft 30. The roll-up shaft 30 is rotated about its axis to roll up the first blind sheet 10. A coil spring (not shown) is provided between the roll-up shaft 30 and the case 3 to urge the roll-up shaft 30. More specifically, the coil spring urges the roll-up shaft 30 in the direction of rolling up the first blind sheet 10. Accordingly, the roll-up shaft 30 rolls up the first blind sheet 10 by the urging force of the coil spring. The roll-up shaft 31a is axially supported in the other case 31. The roll-up shaft 31a rolls up the second blind sheet 13 by using the urging force of a coil spring provided between the roll-up shaft 31a and the case 31.

Next, an essential portion of the sun shade apparatus 1 will be described in detail.

Figure 2:
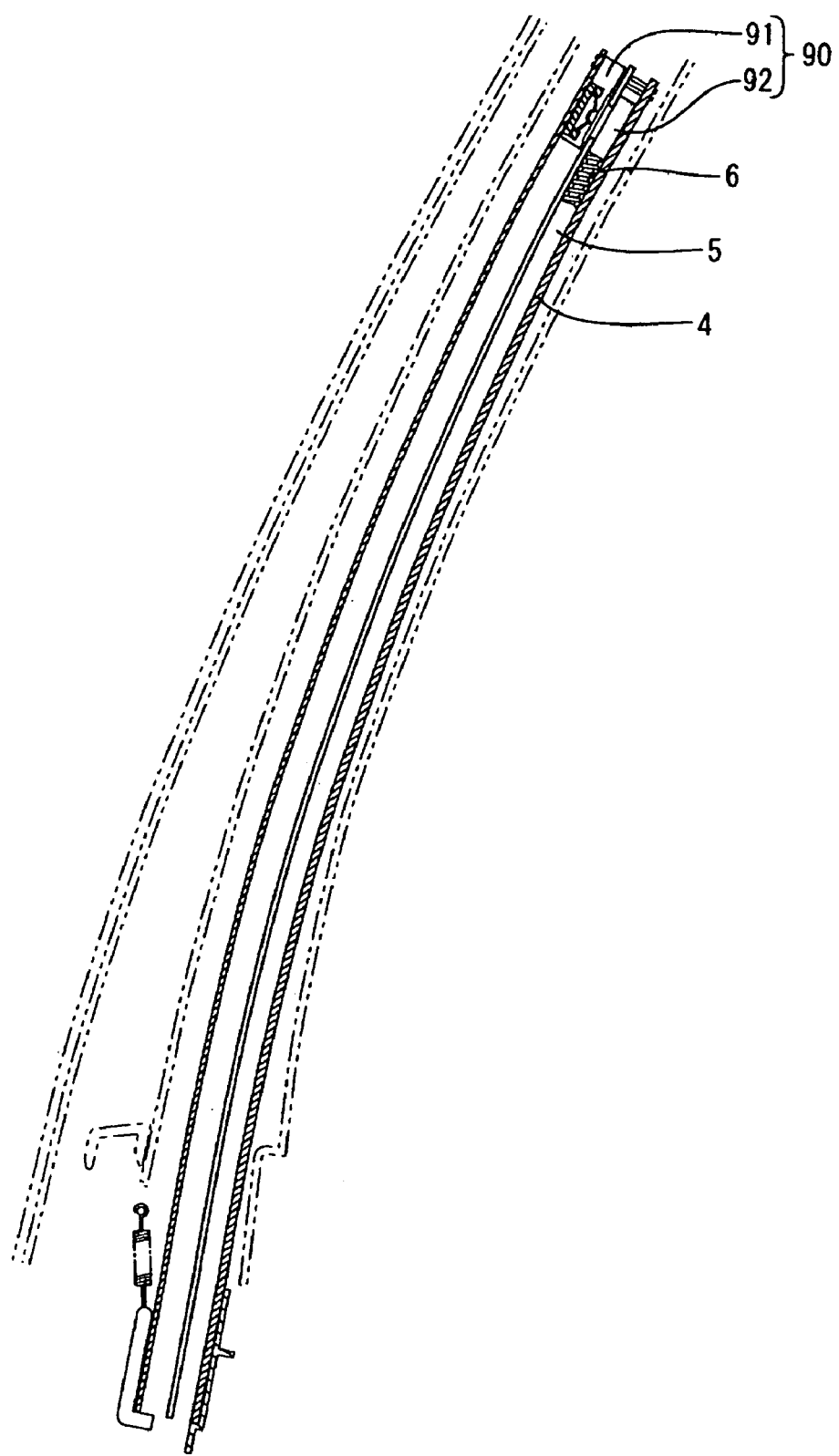
FIG. 2 is a sectional view taken along the line A-A in FIG. 1, showing a cable in a state of being forced out.
Figure 3:
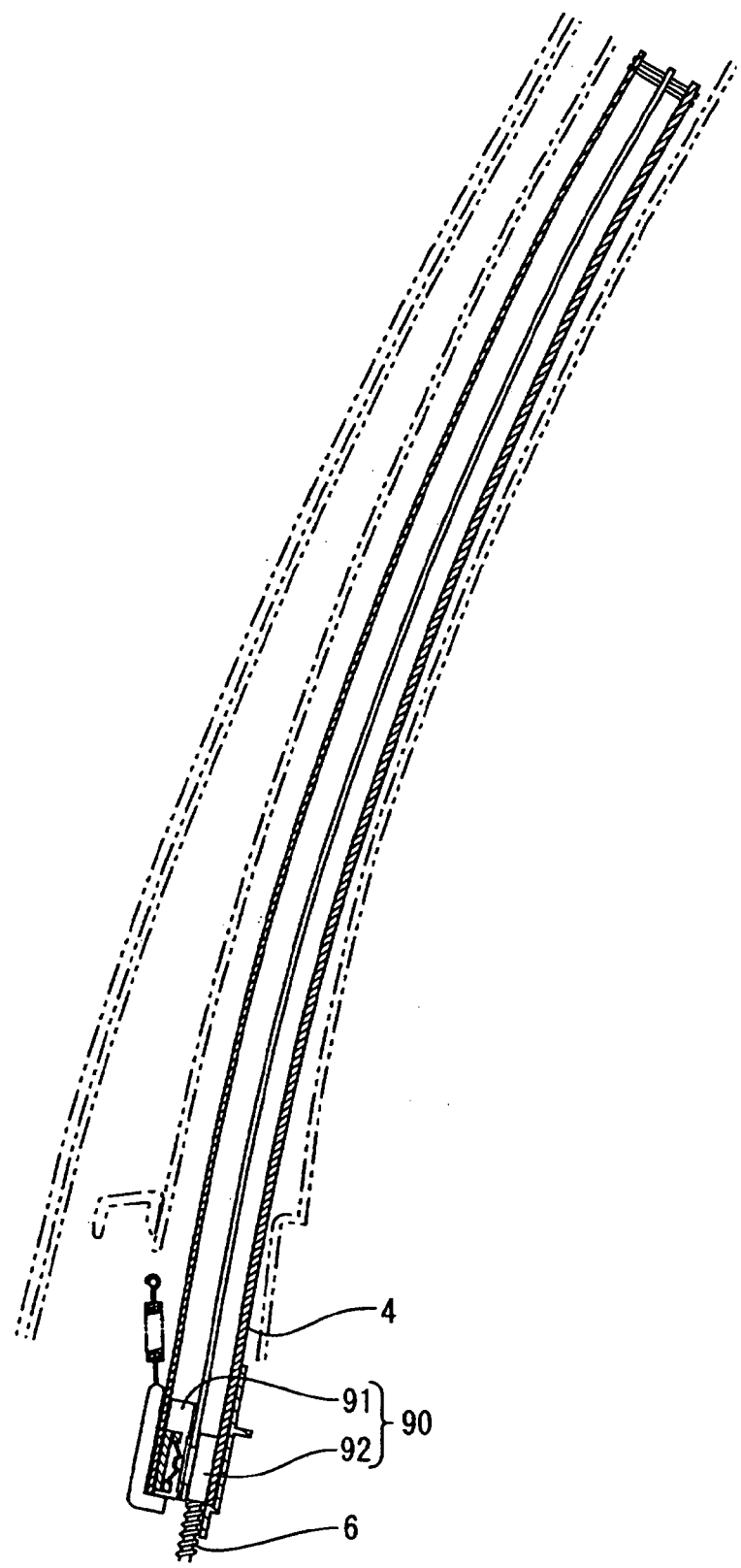
Figure 4:
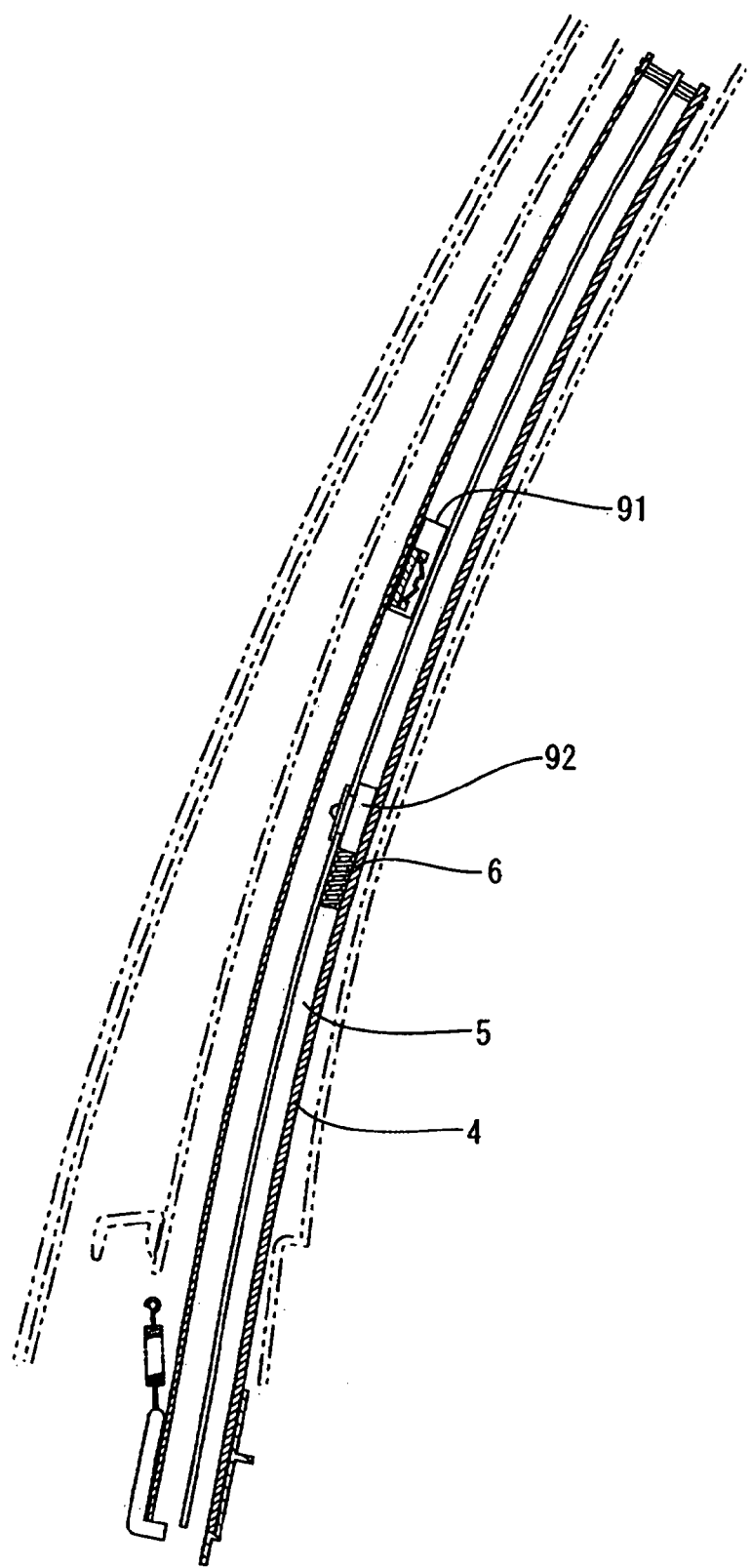
FIG. 4 is a sectional view taken along the line A-A in FIG. 1, showing a state of being released from a connection.

FIGS. 2 to 4 are sectional views taken along line A-A in FIG. 1 to illustrate the cable 6 stretching operation of the sun shade apparatus 1 and the connection aspect between the cable 6 and the slider 12 of the first blind sheet 10 (see FIG. 1). FIG. 2 is a diagram showing a situation where the first blind sheet 10 is stretched to a shielding state, i.e., a situation where the cable 6 is in a forced-out (paid-out) state of being forced out from the pay-out device 7. FIG. 3 is a diagram showing a situation .where the first blind sheet 10 is retracted into an open state ("open" in this case means the state of the window portion being uncovered from the state of being covered with the sheet), i.e., a situation where the cable 6 is in a drawn in state of being drawn in by the pay-out device 7. FIG. 4 is a diagram showing the mechanism when the cable 6 and the first blind sheet 10 are released from a connected state. The sliders 12 are provided on the front-rear direction ends of the frame 11 and the cables 6 are respectively connected to the sliders 12 by the same mechanisms.

As shown in FIG. 1, an end portion of each cable 6 is connected to the slider 12 provided on the frame 11 for the first blind sheet 10 by means of the connector 90. The connector 90 has a recessed female engaging portion 91 provided on the first blind sheet 10 side (i.e., on the slider 12 side) and a projecting male engaging portion 92 provided on the cable 6 side. The male engaging portion 92 is engaged with the female engaging portion 91 to connect the cable 6 and the first blind sheet 10. The arrangement may alternatively be such that a female engaging portion is provided on the cable 6 side; a male engaging portion is provided on the first blind sheet 10 side; and these engaging portions are engaged with each other to realize connection.

FIG. 5 is a schematic sectional view showing details of the connector 90.

In the connector 90, the female engaging portion 91 is connected to the slider 12 as shown in FIG. 5, while having a recessed shape formed of a plate spring elastically deformable. More specifically, the female engaging portion 91 is constituted by a spring formed into projecting and recessed shapes. More specifically, the female engaging portion 91 has a recess 97 provided between two projections 95 and 96 formed along the cable 6 paying out direction, i.e., the cable 6 forcing-out or drawing-in direction. A gap is provided between the projections 95 and 96 of the female engaging portion 91 and a retaining member 100 of the female engaging portion 91 to permit elastic deformation sufficiently.

The material of the male engaging portion 92 is not particularly specified. For example, in the present illustrative aspect, a member made of a resin material and formed into a projecting shape is used as the male engaging portion 92. The male engaging portion 92 has a projecting shape (projection 93) having slanting surfaces 98 and 99 in the cable 6 paying out direction, i.e., the cable 6 forcing-out or drawing-in direction.

The first blind sheet 10 and the cable 6 are connected to each other by the connector 90 consisting of the above-described male engaging portion 92 and female engaging portion 91 to enable the first blind sheet 10 to stretch with the cable 6 forcing-out or drawing-in operation. That is, when the cable 6 is moved in the direction of being forced out direction (paid out) by the operation of the motor 71, the first blind sheet 10 is stretched into the shielding state at which it shields the window portion 2a. When the cable 6 is moved in the direction of being drawn in (drawn back) by the operation of the motor 71, the first blind sheet 10 is retracted into the open state at which it unshields the window portion 2a and rolled up around the roll-up shaft 30.

The first blind sheet 10 can be stretched by the above-described stretching means (6, 7). In the present illustrative aspect, the connector 90 is provided with a connection release mechanism which operates in the event of emergency (abnormality), e.g., in the event that a foreign object is jammed on the first blind sheet 10 (see FIG. 4). The connection release mechanism in this case is a mechanism for releasing the cable 6 and the first blind sheet 10 from the connection in a case where a load is imposed in the direction opposite to the first blind sheet 10 stretching or drawing-in direction, for example, due to jamming of a human hand or some other foreign object on the first blind sheet 10 to produce a load equal to or higher than a predetermined value against the cable 6 forcing-out or drawing-in operation.

More specifically, when a load equal to or higher than a predetermined value is imposed against the cable 6 forcing-out or drawing-in operation, the female engaging portion 91 and the male engaging portion 92 are disengaged from each other based on elastic deformation of the plate spring forming the female engaging portion 91, thereby releasing the cable 6 and the first blind sheet 10 from the connection. That is, during normal operation without a load equal to or higher than the predetermined value, the cable 6 and the first blind sheet 10 are connected to each other by fitting (engagement) between the projection 93 of the male engaging portion 92 and the recess 97 of the female engaging portion 91 as shown in FIG. 5. In the event of abnormality under a certain load, release from the fitted (engaged) state is effected by elastic deformation of the plate spring forming the recess 97 of the female engaging portion 91 to release the cable 6 and the first blind sheet 10 from the connection.

Thus, the plate spring of the female engaging portion 91 functions dominantly in the connection release mechanism. The point in operation as to whether the projection 93 of the male engaging portion 92 and the female engaging portion 91 are disengaged by elastic deformation of the plate spring corresponds to the threshold of starting of the operation of the connection release mechanism.

The connection release mechanism is provided as described above to enable prevention of generation of a fault such as forcibly drawing back the first blind sheet 10 by the cable 6 and, hence, prevention of a fault such as deformation of the first blind sheet 10, for example, even when a load is applied to the first blind sheet 10.

Since in particular the female engaging portion 91 has the recess 97 between at least two projections 95 and 96 formed along the cable 6 forcing-out or drawing-in direction, the projection 93 of the male engaging portion 92 is fitted in the recess 97 positioned between the two projections 95 and 96. At the time of cable 6 forcing out operation, therefore, the projection 93 of the male engaging portion 92 comes off from the front (upper) projection 95 side of the two projections 95 and 96 of the female engaging portion 91. At the time of drawing-in operation, the projection 93 of the male engaging portion 92 comes off from the rear (lower) projection side 96. Disengagement is effected by this coming-off. Thus, release from the connection can be suitably performed in the event of application of a load regardless of the cable 6 moving direction, that is, regardless of the first blind sheet 10 stretching direction.

Further, since the projection 93 of the male engaging portion 92 has the slanting surfaces 98 and 99 in the cable 6 forcing-out or drawing-in direction, application of a large force between the male engaging portion 92 and the female engaging portion 91 at the time of release from the connection can be avoided to achieve a smooth release operation.

That is, the recess and projection can be released from the fitted state in the direction along the slanting surfaces 98 and 99 at the time of release from the connection and, therefore, the release operation can be performed smoothly. Also, the magnitude (critical value) of the load at which release from the connection is started can be designed through the slanting angle of the slanting surfaces 98 and 99. For example, release from the connection is performed at a smaller load if the slanting angle of the slanting surfaces 98 and 99 is reduced, and release from the connection is performed at a higher load if the slanting angle is increased.

Figure 6:
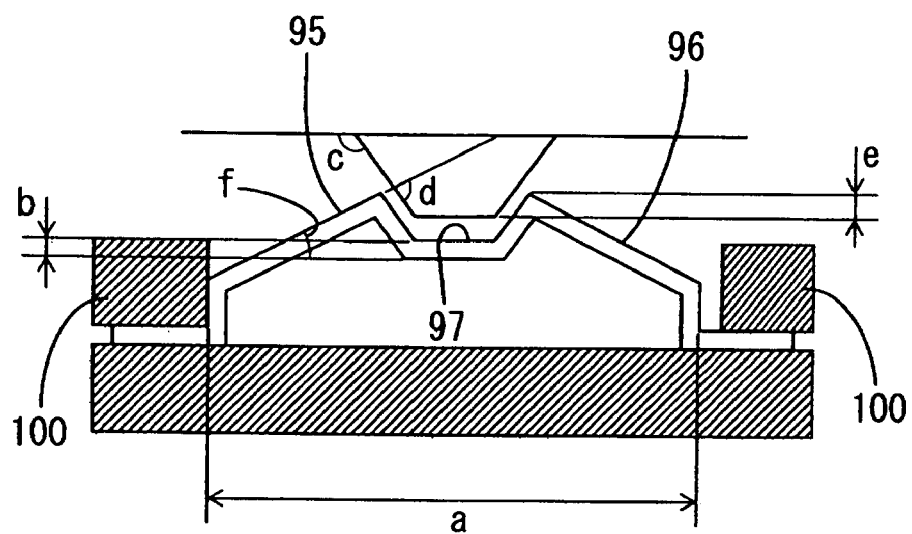
FIG. 6 is a schematic diagram for explaining the size and other factors of the connector.

FIG. 6 is a diagram for explaining the shape of the connector 90.

If the width of the female engaging portion 91, i.e., the width a of the plate spring is 12; the thickness b of the plate spring is 0 or more; and the amount (height) e of intrusion of the projection 93 into the recess 97 of the female engaging portion is 0.7, it is preferable to set the angle d between the slanting surfaces of the projections 95 and 96 of the female engaging portion and the slanting surface of the projection 93 of the male engaging portion 92 to a value equal to or larger than 67° and equal to or smaller than 85°, that is, to set the slanting angle c of the slanting surface of the projection 93 to a value equal to or larger than 122° and equal to or smaller than 140° in stabilizing the disengagement operation when the slanting angle f of the slanting surfaces of the projections 95 and 96 is about 30°.

Since a plate spring is used as the connection release mechanism of the connector 90 in the sun shade apparatus 1 of the present illustrative aspect, a reduction in size of the apparatus can be achieved in comparison with a case where a spring member or the like is used. Also, since the lap between the recess and projection of the female engaging portion 91 and the male engaging portion 92 changes depending on the width of the rail 4 in particular, the magnitude of the load for release from the connection can be set to a predetermined value (target value) by suitably changing the height of the plate spring. This means that the arrangement of the sun shade apparatus 1 of the present illustrative aspect can be applied to a wide range of use with respect to various window portions.

The present invention is not limited to the above-described illustrative aspect. Other illustrative aspects described below are also conceivable.

(1) While in the above-described illustrative aspect the connector 90 connects the first blind sheet 10 and the cable 6 by means of the sliders 12 provided on the frame 11 for the first blind sheet 10, the arrangement may alternatively be such that the first blind sheet 10 and the cable 6 are directly connected to each other.

(2) While the connection release mechanism is provided on the first side window 2a side in the above-described illustrative aspect, the connection release mechanism can also be provided on the second side window 2b side. That is, a connector for connecting the second blind sheet 13 and the cable 60 by means of the slider 15 provided on the frame 14 for the second blind sheet 13 may be provided and this connector may be provided with the above-described connection release mechanism.

(3) While the sun shade apparatus 1 is provided on the window portions of the vehicle door 23 in the above-described illustrative aspect, the sun shade apparatus 1 according to the present invention can be applied to house windows as well as to vehicle windows.

What is claimed is:

1. A sun shade apparatus comprising:
   a motor;
   a cable configured so as to be capable of being forced out or drawn in by operation of said motor, such that when said cable is forced out, said cable moves in a first direction, and when said cable is drawn in, said cable moves in a second direction;
   a curtain capable of shielding a window portion by being stretched between a shielding state and an open state on the window portion by a forcing out or drawing in operation of said cable;
   a connector having a cable side, a curtain side, and a male engaging portion disposed on the cable side or on the curtain side and having a projection and a female engaging portion disposed on the curtain side or on the cable side and having a recess formed by a plate spring, said connector configured to connect said cable and said curtain to each other by engaging said male engaging portion with said female engaging portion; and
   a connection release mechanism disposed in said connector, said connection release mechanism configured to fit the projection and the recess to each other during normal operation to form a fitted state, and configured to release the projection and the recess from the fitted state by elastic deformation of said female engaging portion to enable release of said cable and said curtain from a state of being connected by said connector regardless of whether the cable moves in the first direction or the second direction when a load equal to or higher than a predetermined value is applied against the forcing out or drawing in operation of said cable,
   wherein said female engaging portion has said recess disposed between at least two projections formed along the first direction or the second direction.

2. A sun shade apparatus according to claim 1, wherein said projection has a projecting shape with a slanting surface in the first direction or the second direction.

* * * * *